No. 737,038. PATENTED AUG. 25, 1903.
E. STICKLER.
GATE.
APPLICATION FILED JUNE 1, 1903.
NO MODEL.

Witnesses
F. A. Parron
M. A. Schmidt

Inventor
Elias Stickler
by Milo B. Stevens & Co.
Attorneys

No. 737,038. Patented August 25, 1903.

UNITED STATES PATENT OFFICE.

ELIAS STICKLER, OF MARENGO, IOWA.

GATE.

SPECIFICATION forming part of Letters Patent No. 737,038, dated August 25, 1903.

Application filed June 1, 1903. Serial No. 159,542. (No model.)

*To all whom it may concern:*

Be it known that I, ELIAS STICKLER, a citizen of the United States, residing at Marengo, in the county of Iowa and State of Iowa, have invented certain new and useful Improvements in Gates; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to gates, and has for its object to provide an improved construction whereby the front end of the gate may be raised to swing clear of snow-drifts or other obstructions and also to permit small stock to pass thereunder.

A further object is to provide simple and efficient means for holding the gate in the position to which it may be raised.

Figures 1, 3:
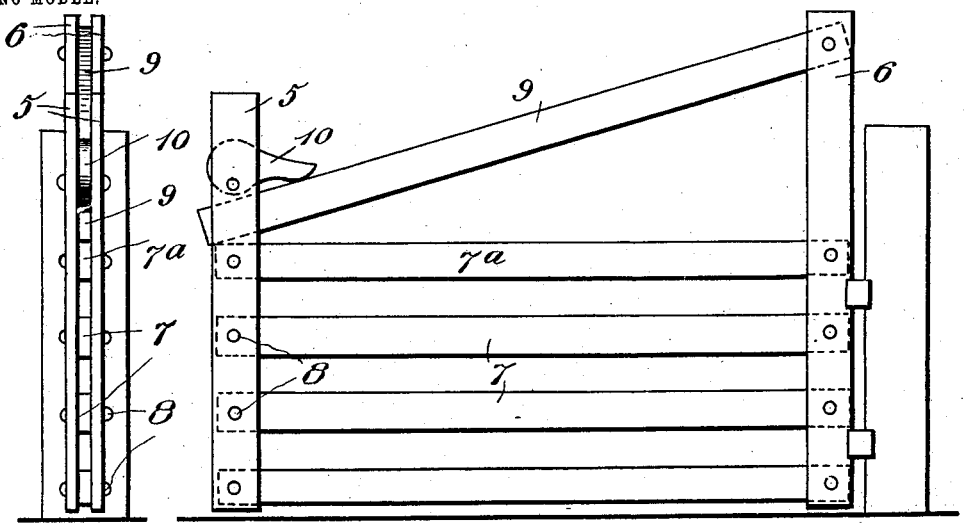
Figure 2:
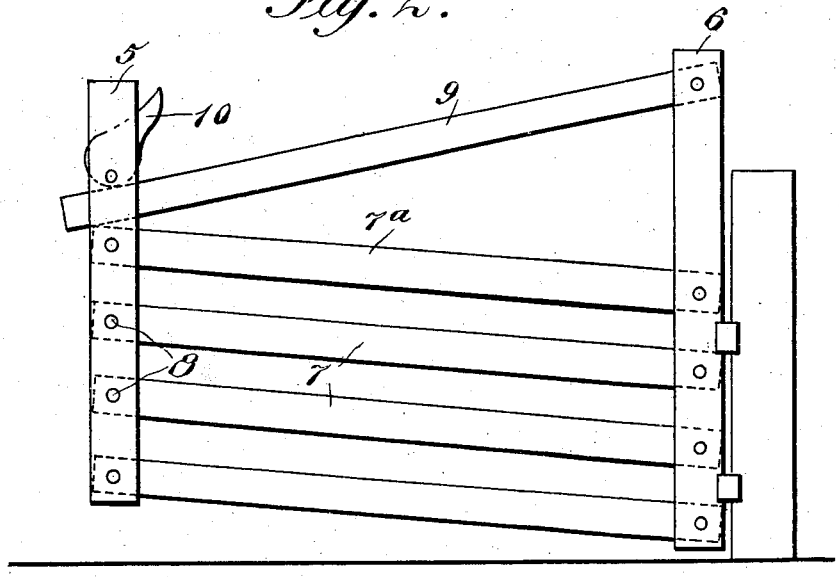

In the accompanying drawings, Figure 1 is a side elevation of my improved gate. Fig. 2 is a like view showing the same raised. Fig. 3 is an edge view.

Referring specifically to the drawings, 5 and 6 indicate vertical battens. There are two of each of these battens and the horizontal bars 7 extend therebetween and are pivoted thereto, as at 8, both ends being pivoted, as shown. This construction permits the front end of the gate to be raised, as shown in Fig. 2. In order that the gate may be held in this position, I pivot a bar 9 to the battens 6, at the top thereof. The opposite end of said bar passes loosely between the battens 5 and rests on the uppermost one, $7^a$, of the bars 7. A cam-clamp 10 is pivoted between the battens 5 and is adapted to clamp the bar 9 against the bar $7^a$. When the clamp is loosened, the front end of the gate may be raised or lowered, the bar 9 passing loosely between the battens 5. To hold the gate in a desired position it is necessary only to clamp the bar 9, as above described.

The gate may also be lowered so that the front end will rest on the ground. This will take the weight off of the hinges and considerably lessen the wear of the same. The bar 9 is of such a length as to permit a large range of adjustments.

Having thus described my invention, what is claimed as new, and desired to secure by Letters Patent, is—

A gate comprising horizontal bars, a pair of vertical battens at each end of said bars embracing the same and to which they are pivoted, a bar pivoted to the rear battens and extending loosely between the front battens, and a cam-clamp over the loose end of said bar for clamping it to the top horizontal bar, substantially as described.

In testimony whereof I affix my signature in presence of two witnesses.

ELIAS STICKLER.

Witnesses:
D. CALLAHAN,
J. B. MURPHY.